Figure 1:
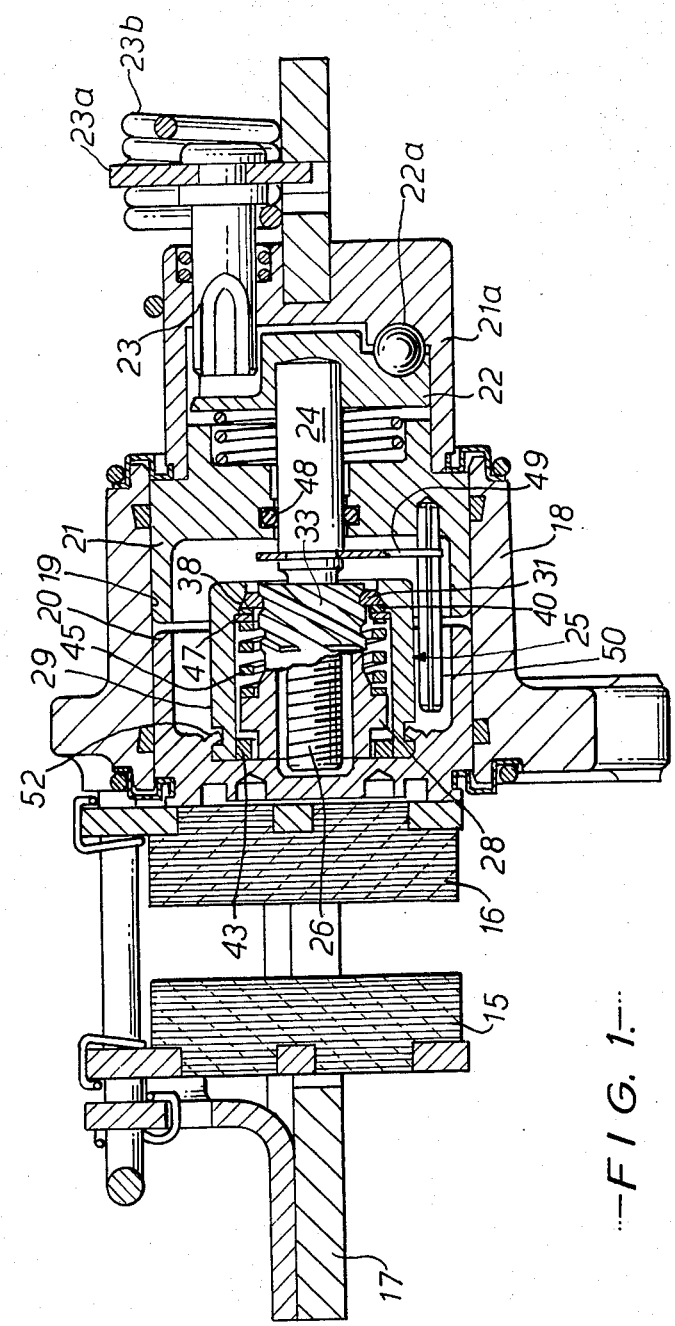

United States Patent [19]

Margetts

[11] 3,999,638
[45] Dec. 28, 1976

[54] BRAKE SLACK ADJUSTERS

[75] Inventor: Hugh Grenville Margetts, Leamington Spa, England

[73] Assignee: Girling Limited, Birmingham, England

[22] Filed: Jan. 30, 1976

[21] Appl. No.: 653,707

Related U.S. Application Data

[62] Division of Ser. No. 592,459, July 2, 1975.

[30] Foreign Application Priority Data

July 3, 1974 United Kingdom ............ 29557/74

[52] U.S. Cl. .......................... 188/196 D; 188/71.9
[51] Int. Cl.[2] ......................................... F16D 65/56
[58] Field of Search .......... 188/71.9, 196 F, 196 D, 188/196 BA

[56] References Cited

UNITED STATES PATENTS

| 3,774,733 | 11/1973 | Farr | 188/196 D |
| 3,789,959 | 2/1974 | Kawaguchi | 188/71.9 |
| 3,900,084 | 8/1975 | Farr | 188/196 F |

Primary Examiner—Duane A. Reger
Attorney, Agent, or Firm—Scrivener Parker Scrivener and Clarke

[57] ABSTRACT

An automatic slack adjuster for a vehicle brake is disposed between a piston and another component, such as a counter piston, of a hydraulic actuator. The adjuster mechanism is housed in an encapsulating container which is positively attached to the piston. A strut, on which an auxiliary mechanical actuator fitted to said other component acts, is in screw-threaded connection with a nut of the adjuster mechanism. The adjuster mechanism is of the incremental type and is adapted to turn the nut responsively to excess axial travel between the container and the strut upon hydraulic brake application, the strut being sealed to said other actuator component. Grossly excessive travel between the piston and the other actuator component beyond the maximum possible travel between the strut and the container is permitted by displacement of the strut relative to said other component.

6 Claims, 3 Drawing Figures

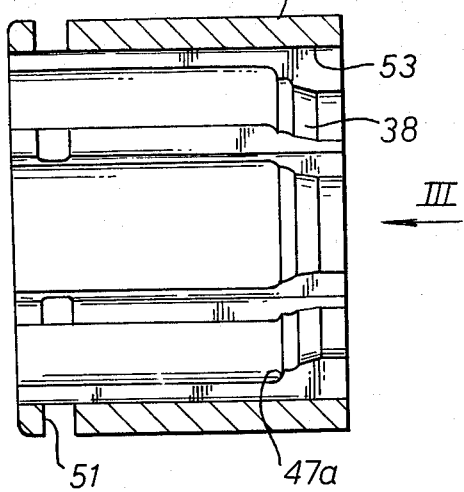
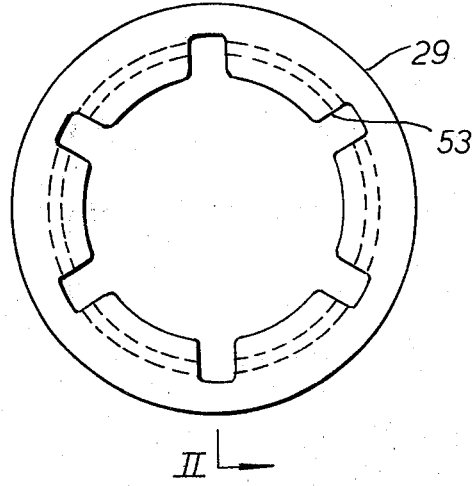

BRAKE SLACK ADJUSTERS

This is a division of application Ser. No. 592,459 filed July 2, 1975.

The present invention relates to a hydraulic brake actuator for a vehicle brake system having a piston and another actuator component, such as a counter-piston, movable apart by the application of hydraulic pressure therebetween. The present invention relates more particularly to an incremental type automatic brake slack adjuster disposed between said actuator components and comprising a slack adjuster mechanism, which is housed in an encapsulating container member and includes a nut member, and a strut member on which the nut member is screw-threaded, the adjuster mechanism being adapted to turn the nut member to effect automatic adjustment responsively to excess axial travel between the strut and container members upon hydraulic application.

U.S. Patent application Ser. No. 278355 filed on Aug. 7, 1972 by G. P. R. Farr (now issued as U.S. Pat. No. 3,274,733, there is described a slack adjuster mechanism for a vehicle brake system comprising a nut member having an internal screw thread adapted to mate with an external screw thread on a strut member to form a non-reversible screw thread connection, an encapsulating container member surrounding said nut member, an annular member disposed within said container member and encircling said nut member, said annular member and one of said nut and container members having a reversible screw thread connection therebetween, said annular member and the other of said nut and container members having co-operating friction surfaces therebetween, and resilient means disposed within said container member and axially biasing said annular member in a direction in which said friction surfaces are urged towards one another.

A reversible screw thread connection between two members is a connection such that axial displacement of one member causes rotation of the other member and vice versa, whereas a non-reversible screw thread connection between two members is one in which an axial force applied to one member cannot normally cause relative rotation between the members. Whether a screw thread connection is reversible or not depends upon the pitch and flank angles of the thread and the coefficient of friction between the members at the screw thread connection.

Assembly is simplified if the nut member is captively arranged within the container member. Preferably the reversible screw thread connection is disposed between the annular member and the nut member, the reversible screw thread connection comprises an internal thread inside the annular member mating with an external thread around the nut member and the co-operating friction surfaces comprise an external annular surface around the annular member co-operating with an internal annular surface inside the container member.

The container member of the above adjuster mechanism is force-fitted in a bore in one member, such as a piston, of a hydraulic actuator. In the event that the piston travel is greater than can be accommodated by the parts of the adjuster mechanism, the container member is pulled out of its bore to avoid damage to the adjuster mechanism.

It is possible to move the container back towards its original position by operating the hand brake mechanism, but as the travel of the hand brake mechanism is necessarily small, this being the reason why the adjuster is provided, return can only be effected by a series of hand brake applications (perhaps up to twenty), and between each hand brake application a number of hydraulic applications (perhaps sixty) to operate the adjuster mechanism to reduce the brake clearance produced by the movement of the container member and enable further movement of the container member upon the next hand brake application. This sequence is tedious and unlikely to be performed adequately in service and if it is not performed satisfactorily the hand brake will be inoperative. The repeated movements of the container member may cause it to lose its interference fit with the piston, due to wear, and the consequential looseness of the container member would lead to malfunction.

According to the present invention a hydraulic actuator for a vehicle brake system comprises two components movable apart upon the application of hydraulic pressure therebetween and an automatic slack adjuster disposed between said components, at least one of which is a piston, said slack adjuster comprising an incremental type automatic slack adjuster mechanism, which includes a nut member and an encapsulating container member directly and positively attached to said piston, and a strut member which is in screw-threaded connection with said nut member and which is associated with the other of said actuator components and is sealed thereto, the adjuster mechanism being adapted to turn the nut member responsively to axial travel between said container member and said strut member in excess of the desired brake slack upon the application of hydraulic pressure, grossly excessive travel between said piston and the other actuator component beyond the maximum possible travel between the strut and container members being permitted by axial displacement of the strut member relative to said other actuator component.

Preferably one piston acts on a directly operated brake pad assembly and another piston acts on a yoke which is slidably mounted on a body member housing the hydraulic actuator and acts on an indirectly operated brake pad assembly, and the container member is positively secured to one of the pistons whilst the strut member is associated with the other piston. Advantageously an auxiliary mechanical actuator acts between the strut member and the yoke. The mechanical actuator may comprise a cam housed in said other piston.

According to another aspect of the present invention the container member of a slack adjuster mechanism of the above described kind has a formation on its outer peripheral surface so that when the adjuster mechanism is placed inside a hollow piston for a hydraulic brake actuator a portion of the hollow piston can be deformed, e.g. swaging, into the said formation on the container member whereby the container member is positively secured to the piston.

The invention is further described by way of example, with reference to the accompanying drawings in which:

FIG. 1 is a longitudinal sectional view of a slack adjuster mechanism fitted to a reaction type hydraulic disc brake with opposed pistons, in accordance with the present invention, FIG. 2 is a longitudinal sectional view of a container member of the adjuster mechanism, taken on the line II of FIG. 3; and FIG. 3 is an end view of the container member viewed in the direction of the arrow III in FIG. 2.

FIG. 1 of the drawings show opposed pistons 20 and 21 of a hyraulic actuator for a disc brake of the kind described and illustrated in British Patent Nos. 1075371 and 1147639. The pistons 20 and 21 are slidable in a through bore 19 in a fixed body member 18. A plate-like yoke 17 straddles the disc (not shown) and is slidably supported in longitudinal grooves extending along opposite sides of the fixed body member 18. The piston 20 acts upon a directly operated pad assembly 16 and the piston 21 acts upon the yoke 17 which in turn acts upon an indirectly operated pad assembly 15 opposed to the directly operated pad assembly 16, the disc extending between the pad assemblies 15 and 16. The brake is applied hydraulically by supplying the brake fluid to the space between the opposed pistons 20 and 21.

An auxiliary mechanical actuator (hand brake) comprises a cam 22 journalled within an extension 21a of the piston 21 on one end of a strut 24. The auxiliary mechanical actuator is of the kind described in British Patent No. 1194844. The cam 22 is a face cam and three balls 22a are arranged between corresponding inclined grooves or ramps formed on the cam 22 and the base of the piston extension 21a. For the purpose of turning the face cam 22 a second cam 23 is provided and is journalled in the piston extension 21a about an axis parallel to but spaced from the piston axis. The cam 23 thereby lies at the outside of the yoke 17 and can be turned by means of a lever 23a against force of a return spring 23b. It will be noted that the piston extension 21a has a notch in which the inner edge of the yoke 17 is received.

The strut 24 constitutes one part of a mechanism of adjustable length whose other part comprises a nut 28 which forms part of a slack adjuster mechanism 25. The strut 24 has an external screw thread 26 mating with an internal screw thread in the nut 28 to form a non-reversible screw thread connection.

The slack adjuster mechanism 25 includes a cylindrical encapsulating container 29 which is secured by means to be described hereinafter inside the piston 20 which is hollow.

The slack adjuster mechanism 25 is described more fully in the above-mentioned Application Ser. No. 278355 filed Aug. 7, 1972 by G. P. R. Parr (now issued as U.S. Pat. No. 3,774,733) and further comprises an annulus 31. A multi-scart external screw thread 33 on the nut 28 mates with an internal screw thread in the annulus 31 to form a reversible screw thread connection of opposite hand to the above-mentioned non-reversible screw thread connection. An internal conical friction surface 38 formed inside the container member 29 co-operates with an external conical friction surface on the annulus 31. A spring 45 acts between an external flange on the nut 28 and a washer 47 which bears against a step 47a (see FIG. 2) formed inside the container member 29. A relatively light spring 40 acting on the annulus 31 is disposed between the annulus and the washer 47. A ring 43 pressed into the end of the container member 29 co-operates with the external flange on the nut 28 to hold the nut captive inside the container member before the container member is fitted to the piston 20. After fitting, the nut 28 can bear against the inner end of the piston 20 as shown. The strut 24 extends slidably through the piston 21 and is sealed thereto by means of a sealing ring 48. The strut 24 is thereby urged to the right by the pressure of the hydraulic fluid supplied to the space between the pistons 20 and 21. A radially extending lever 49 is non-rotatably attached at one end to the strut 24 and has an aperture or notch at its other end in which a pin 5C attached to the piston 21 is slidably received for the purpose of preventing rotation of the strut 24 while permitting axial displacement thereof.

As can be seen in FIG. 1, the lever 49 has a substantial radial length between the axes of the strut 24 and pin 50. Due to this relatively long moment arm, the force of the lever end against the side of the pin 50 as they prevent rotation of the strut is relatively small so that any frictional resistance of the lever on the pin tending to retard or impede axial movement of the strut is minimized.

Should pad wear take place when the brake is hydraulically applied, axial clearance at the reversible screw thread connection 33 is taken up and the annulus 31, prevented from turning by the conical friction surface 38, causes the nut 28 to turn to effect adjustment at the non-reversible screw thread connection 26. When the brake is released, the nut does not turn back because the annulus 31 tends to separate from the friction surface 38, thus allowing the annulus to turn under the influence of the reversible screw thread connection 33. Reference may be made to the above-mentioned Patent Applications for a fuller description of the mode of operation of the automatic adjuster mechanism 25. Since the reversible screw thread connection 33 is of coarser pitch than the non-reversible screw thread connection 26 the adjustment effected at a single adjustment cycle, i.e. turning of the nut 28 followed by turning of the annulus 31, does not fully take up the extra piston travel due to the pad wear which initiates the adjustment cycle. Nevertheless, successive brake applications hydraulically will cause successive adjustment cycles producing at the non-reversible screw thread connection 26 successive adjustments of decreasing magnitude. In other words, the slack adjuster mechanism 25 is of the so-called incremental type adapted to effect incremental adjustment.

As shown in FIG. 2 of the drawings the container member 29 has an external peripheral groove 51 adjacent its end which is to abut the base of the piston 20. For the purpose of firmly securing the container member 29 to the piston 20 a portion 52 of the piston 20 is peened over into the annular groove 51. It may happen that the pistons 20 and 21 are moved apart under hydraulic pressure by a distance substantially greater than the maximum possible travel between the nut 28 and the container member 29. This can happen for example if the brake is actuated with the brake pad assemblies removed or when worn pad assemblies are fitted after the piston 20 has been screwed back along the strut 26 to reset the adjuster, e.g. when it was intended to fit new pad assemblies. The strut 24 is made of sufficiently small diameter that the axial force applied to the adjuster mechanism 25 when the pistons 20 and 21 move this very large distance apart at one stroke is insufficient to damage the adjuster mechanism. Thus the maximum stroke between the pistons 20 and 21 is accommodated partially by the maximum travel of the strut 24 relative to the container member 29 and partially by axial displacement of the strut 24 relative to the piston 21.

The maximum possible travel between the nut 28 and the container member 29 is that required to fully compress the spring 45. Such maximum possible travel causes a maximum adjustment at the non-reversible screw thread connection between the nut 28 and the strut 24. This maximum adjustment in one adjustment cycle is not of itself sufficient to take up the large clearance associated with the said very large piston travel but only a few brake applications hydraulically are needed to substantially fully take up this clearance and render the handbrake fully effective.

As shown in FIGS. 2 and 3 of the drawings the container member 29 is provided with a plurality of equally angularly spaced internal longitudinal grooves 53. These grooves 53 brake into the external annular grooves 51 and also interrupt the conical friction surface 38 and the step 47a. Since the swaged over portion 52 of the piston 20 does not completely fill the annular groove 51, this annular groove and the longitudinal grooves 53 provide a plurality of points of communication between the interior and exterior of the container member 29 to facilitate bleeding of the brake system.

The container member 29 can be machined from a tube, a forging or a solid piece of metal, but is preferably of sintered metal, the external annular groove 51 being preferably in this case machined into the member 29 after sintering.

I claim:

1. In a hydraulic actuator for a vehicle brake system, said hydraulic actuator comprising first and second components movable apart upon the application of hydraulic pressure therebetween, at least said first component comprising a piston: incremental type automatic slack adjuster disposed between said components and comprising a slack adjuster mechanism within said piston and including a nut member having an internal screw thread, a strut member having an external screw thread meshing with the internal screw thread of said nut member to form a screw thread connection therebetween, said strut member cooperating with said second actuator component, and means sealing said strut member to said second actuator component while permitting relative axial displacement therebetween, said adjuster mechanism being operative to turn said nut member responsively to axial travel between said container and strut members in excess of a desired brake slack, and means for preventing rotation of said strut member with said nut member comprising a radial level non-rotatably attached at one end to said strut, and a pin connected to said second component with its axis spaced from but parallel to the axis of said strut, the opposite end of said lever being slidably received on said pin.

2. In the hydraulic actuator of claim 1 wherein said slack adjuster mechanism is disposed within an encapsulating container member and means mounting said container member within said piston.

3. In the hydraulic actuator of claim 2 wherein said mounting means comprises means directly and positively attaching said container member to said piston.

4. In the hydraulic actuator of claim 3 including means defining a maximum possible relative axial displacement between said container and strut members, travel between said actuator components beyond said maximum relative displacement between said strut and container being permitted by axial displacement of said strut member relative to said second actuator component.

5. In the hydraulic actuator of claim 1 wherein the spacing between the axes of said strut and pin is sufficiently long that in preventing rotation of said strut member with said nut member the frictional resistance of the opposite end of said lever on the side of said pin is sufficiently small as to not substantially impede axial movement of said strut member relative to said second component.

6. In the hydraulic actuator of claim 1 wherein said second component is an hydraulic piston.

* * * * *